US005463799A

United States Patent [19]

Graham

[11] Patent Number: 5,463,799

[45] Date of Patent: Nov. 7, 1995

[54] FASTENER FOR CONNECTING MATERIALS WITH WEAKENED PORTION

[75] Inventor: Robert W. Graham, Dayton, Ohio

[73] Assignees: R. William Graham; Jerald E. Wiewandt, both of Dayton, Ohio

[21] Appl. No.: 88,776

[22] Filed: Jul. 8, 1993

[51] Int. Cl.$^6$ .............................. A44B 9/00; F16B 21/00

[52] U.S. Cl. ........................ 24/704.1; 24/704.2; 24/711.1

[58] Field of Search .............................. 24/704.1, 711.1, 24/704.2, 72.7; 227/67; 403/4, 13

[56] References Cited

U.S. PATENT DOCUMENTS

| | | | |
|---|---|---|---|
| 3,103,666 | 12/1961 | Bone . | |
| 3,686,717 | 8/1972 | Mercer . | |
| 3,733,657 | 5/1973 | Lankton . | |
| 4,039,078 | 8/1977 | Bone . | |
| 4,121,487 | 10/1978 | Bone . | |
| 4,229,930 | 10/1980 | Ostermaier | 24/72.7 |
| 4,263,697 | 4/1981 | Speedie | 24/704.2 |
| 4,347,932 | 9/1982 | Furutu | 24/711.1 |
| 4,456,123 | 6/1984 | Russell | 24/72.7 |
| 4,654,935 | 4/1987 | Bone . | |
| 4,844,318 | 7/1989 | Kunreuther | 227/67 |
| 5,027,477 | 7/1991 | Seron | 24/3 B |
| 5,088,757 | 2/1992 | Hauglin | 403/13 |
| 5,199,135 | 4/1993 | Gold | 24/300 |
| 5,244,135 | 9/1993 | Nelson | 24/3 B |

*Primary Examiner*—Victor N. Sakran
*Attorney, Agent, or Firm*—R. William Graham

[57] ABSTRACT

A fastening device of the type used to secure a plurality of like or unlike materials together comprising an integral thermoplastic body having opposing cross bar like ends connected by an intermediate portion. The intermediate portion is provided with a weakened portion so that when opposing human gripping forces are applied to the cross bar like ends, the intermediate portion readily breaks thereby releasing the materials without harming them.

6 Claims, 1 Drawing Sheet

FASTENER FOR CONNECTING MATERIALS WITH WEAKENED PORTION

BACKGROUND OF THE INVENTION

The present invention relates to fastening devices and particularly to such devices designed for use in attaching materials to other materials.

In the merchandising of articles, it is usually necessary to identify such articles by price, size, manufacturer, etc., by the application of an identifying label or tag to the merchandise. It is also sometimes necessary to secure articles of clothing to each other. It is desirable that the method of securing such identifying means and articles of clothing, particularly to garments, reliably secure the identifying tag, label or article of clothing to the article and at the same time leave the article free from damage after the fastening device is removed by the consumer. In addition, it is desirable that such devices be relatively inexpensive to manufacture.

To the best of present knowledge and belief, the pertinent prior art is found in U.S. Pat. No. 3,103,666 which issued Sep. 17, 1963 and U.S. Pat. No. 3,686,717 which issued Aug. 29, 1972. The major drawback in these prior art references is the difficulty in which consumers have in removing the fastening devices from the articles of clothing.

The consumer currently has no easy or convenient method in which to remove the fastening devices existing in the market. The consumer either has to use a pair of scissors, a knife, clippers or their teeth to remove the fastening device. Another problem found in the prior art is that in removing the fastening device from the materials, the fastening device is likely to snag, tear, rip or otherwise damage the fastened materials.

Clearly, there is a need for a fastening device which allows for easy and convenient detachment from the fastened materials.

SUMMARY OF INVENTION

It is a primary object of the present invention to provide an improved fastening device of the type described herein which effectively eliminates all the foregoing difficulties.

It is another object of the present invention to provide a fastening device of a cross bar tag like which is provided with a weakened portion included in an intermediate portion to allow for quick and convenient detachment without the use of any tools, teeth, or excessive force.

It is another object of the present invention to provide a fastener which reliably secures two materials together while also providing a relatively easy for detachment.

To these ends the present invention comprises a fastening device having two ends and an elongated intermediate portion connecting the ends. The elongated intermediate portion is provided with a weakened portion which can be readily separable when opposing forces are applied to the two ends. The force from an average person pulling the two ends in opposing directions will be adequately sufficient to break the intermediate portion of the fastening device. Furthermore, the weakened portion will be of sufficient strength to withstand breaking due to forces applied to the fastening device which occur during the normal course of attachment when the device is holding two materials together.

In one embodiment, the weakened portion is generally located in a mid-portion of the intermediate portion. Alternatively, the weakened portion is located generally at the connection between the intermediate portion and one of the ends.

The fastening devices of the present invention can be readily formed in a continuous stock feed to be adapted for use with fastener device attaching apparatuses of the type described in U.S. Pat. No. 3,106,666 issued Sep. 17, 1963. The fastening device of the present invention can also be readily formed to be adaptable for use in assembly line processes for attaching like materials together, i.e. a pair of socks.

To the accomplishment of the above, and to such other objects as may hereinafter appear, the present invention comprises a fastening device as defined in the appended claims and as described specification, taken together with the accompanying drawing.

DESCRIPTION OF A PREFERRED EMBODIMENT OF THE INVENTION

Figure 1:
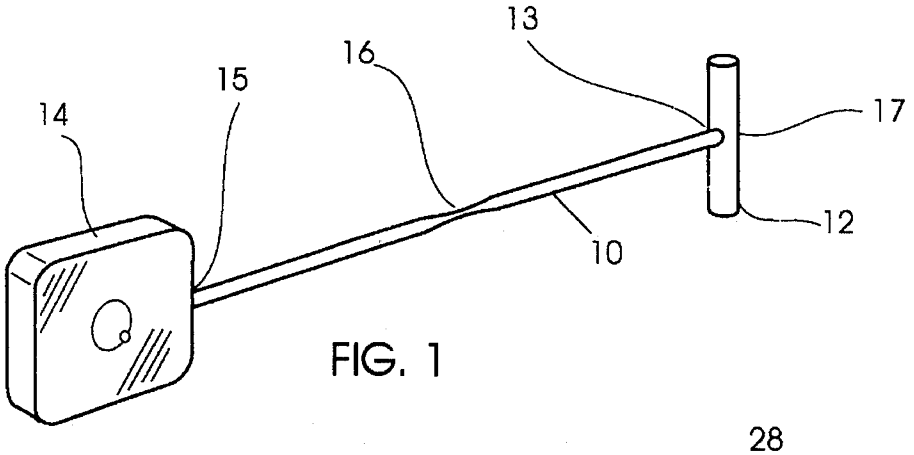
FIG. 1 is a plan view of the fastener with a weakened intermediate portion of the type described by the present invention.

Referring to FIG. 1 the embodiment of the invention herein illustrated provides a fastening device 4 comprising an elongated intermediate portion 10, a cross bar 12 at one end 13 of the intermediate portion 10, and a head portion 14 at another end 15 of the intermediate portion 10, and a weakened portion 16 in the intermediate portion 10. Cross bar 12 is illustrated as a relatively thin cylinder connected about a mid point 17 to the end 13 and extends generally laterally and perpendicular to the intermediate portion to form therewith a generally "T" configuration. While the cross bar 12 and intermediate portion 10 shown in FIG. 3 have a generally cylinder like cross-section, various other shapes may be employed and are intended to be within the scope of the art.

In operation, the cross bar 12 is inserted through fabric or other material along its axial direction, wherein the fabric or material is to be threaded onto the intermediate portion 10 adjacent the cross bar 12, The cross bar 12 thereafter serves as a partial retainer of the fabric or material on the intermediate portion 10. Accordingly, cross bar 12 must have a sufficient length to effectively prevent the fabric or material from slipping over the end 12. In addition, cross bar 12 must have a sufficiently small cross section to allow it to be threaded through the fabric without producing a sizable or noticeable hole therein.

Head portion 14 serves as another partial retainer of the fabric or material threaded on the intermediate portion 10 to prevent the same from slipping over the end 15 and is, in this embodiment, in the form of a generally flat rectangular disc. Here, a variety of shapes may be suitable for the head portion and are intended to fall within the scope of the invention. Together, head portion 14 and cross bar 12 serve to retain the fabric or material on the intermediate portion 10. In one case, for example, a tag is provided with an aperture of standard size used in the art. The tag is positioned adjacent the fabric at a suitable location thereon and the cross bar 12 is inserted through the tag aperture and the fabric in a manner known to the art. The intermediate portion 10 and cross bar 12 are bent over onto each other as they pass through the tag and fabric. This operation is ordinarily accomplished by means of an automatic tag attachment apparatus known to the art which utilizes a hollow slotted needle to pierce the fabric prior to the insertion of cross bar 12 and intermediate portion 10 therethrough.

Figure 2:
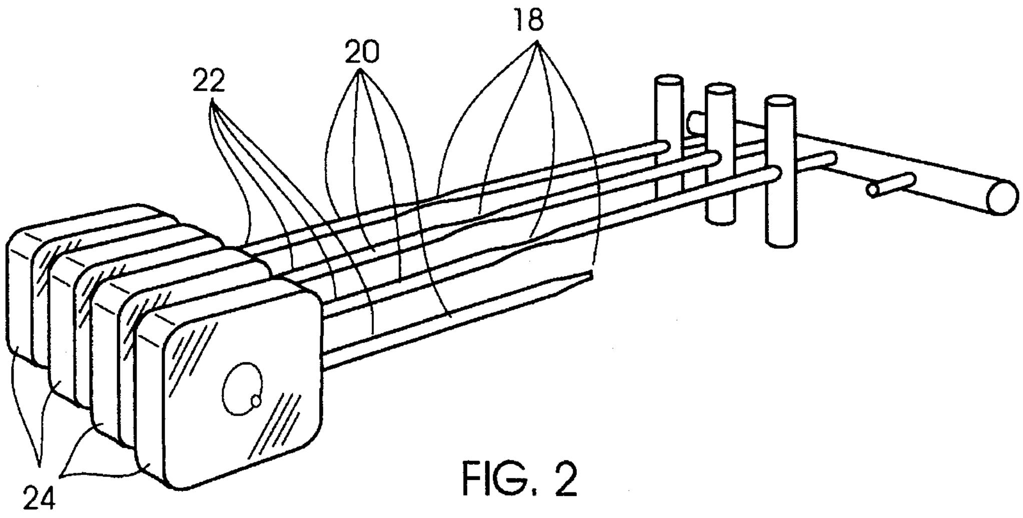
FIG. 2 is a side view of a plural assembly of the fasteners with weakened intermediate portions of the type described by the present invention.

Weakened portions 16 and 18 of the intermediate portions 10 and 20, respectively, are shown in FIGS. 1 and 2, respectively, where the intermediate portions 10 and 20 thin or taper into a mid point to allow for on demand breakage. Alternatively, in FIG. 1 for example, the thinned or tapered portion may be formed at the connections between the ends 13 and 15 and cross bar 12 and head portion 14, respectively. Likewise, the tapered portion of the fasteners 22 shown in FIG. 2 may be so formed. Fastners 22 have head portions 24 which are formed in a connected fashion known in the art.

Figure 3:
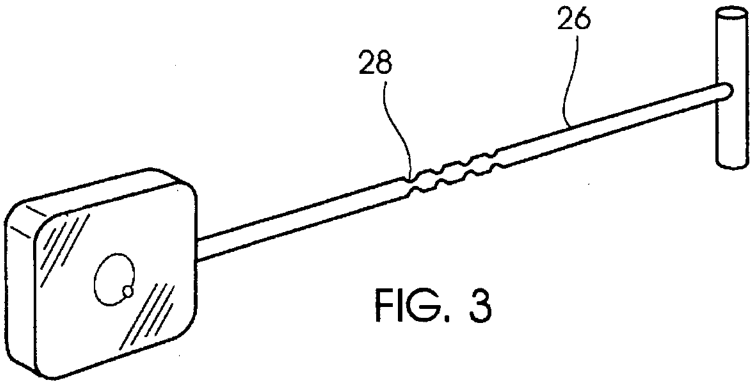
FIG. 3 is a plan view of another fastener with a weakened intermediate portion of the type described by the present invention.

FIG. 3 shows another embodiment which includes the intermediate portion 26 incorporating a plurality of perforations or notched portion 28. While only a few preferred embodiments of the present invention are specifically described, it will be appreciated that many variations may be made, all of which is contemplated within the scope of the present invention as described in the following claims.

I claim:

1. A fastening device for fastening articles of material together comprising:

a cross bar at one end, said bar of a cross section to permit axial insertion through said material producing hole surface of minimal size and relatively insubstantial damage to said material and of a length substantially greater than said cross section to prevent lengthwise passing of said cross bar through said hole surface;

a head portion of a size substantially greater than said cross section to prevent passing of said head portion through said hole surface; and an intermediate portion joining said cross bar and said head portion wherein said intermediate portion includes a weakened portion such that when a pulling force is exerted on said cross bar and said head portion, said weakened portion readily breaks, and wherein said weakened portion is further characterized to include a perforated portion.

2. The device of claim 1, wherein the intermediate portion is further characterized to be generally elongated and of a diameter not greater than said cross section of said cross bar.

3. A fastening device for fastening articles of material together comprising:

a cross bar at one end, said bar of a cross section to permit axial insertion through said material producing hole surface of minimal size and relatively insubstantial damage to said material and of a length substantially greater than said cross section to prevent lengthwise passing of said cross bar through said hole surface;

a head portion of a size substantially greater than said cross section to prevent passing of said head portion through said hole surface; and an intermediate portion joining said cross bar and said head portion wherein said intermediate portion includes a weakened portion such that when a pulling force is exerted on said cross bar and said head portion, said weakened portion readily breaks, and wherein said weakened portion is further characterized to include a tapered portion.

4. The device of claim 3, wherein the intermediate portion is further characterized to be generally elongated and of a diameter not greater than said cross section of said cross bar.

5. A fastening device for fastening articles of material together comprising:

a cross bar at one end, said bar of a cross section to permit axial insertion through said material producing hole surface of minimal size and relatively insubstantial damage to said material and of a length substantially greater than said cross section to prevent lengthwise passing of said cross bar through said hole surface;

a head portion of a size substantially greater than said cross section to prevent passing of said head portion through said hole surface; and an intermediate portion joining said cross bar and said head portion wherein said intermediate portion includes a weakened portion such that when a pulling force is exerted on said cross bar and said head portion, said weakened portion readily breaks, and wherein said weakened portion is further characterized to be of a less tensile strength than the rest of said intermediate portion.

6. The device of claim 4, wherein the intermediate portion is further characterized to be generally elongated and of a diameter not greater than said cross section of said cross bar.

* * * * *